(12) United States Patent
Jouy et al.

(10) Patent No.: US 11,149,577 B2
(45) Date of Patent: Oct. 19, 2021

(54) METHOD AND DEVICE FOR ADJUSTING THE CLEARANCE BETWEEN A ROTOR AND A CONCENTRIC STATOR OF AN AIRCRAFT TURBINE ENGINE

(71) Applicant: SAFRAN AIRCRAFT ENGINES, Paris (FR)

(72) Inventors: Baptiste Marie Aubin Pierre Jouy, Moissy-Cramayel (FR); Laurent Claude Descamps, Moissy-Cramayel (FR); Bertrand Guillaume Robin Pellaton, Moissy-Cramayel (FR); Loic Fabien Francois Villard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 216 days.

(21) Appl. No.: 16/327,170

(22) PCT Filed: Aug. 28, 2017

(86) PCT No.: PCT/FR2017/052291
§ 371 (c)(1),
(2) Date: Feb. 21, 2019

(87) PCT Pub. No.: WO2018/042116
PCT Pub. Date: Mar. 8, 2018

(65) Prior Publication Data
US 2020/0240281 A1    Jul. 30, 2020

(30) Foreign Application Priority Data
Aug. 30, 2016   (FR) ...................................... 16 58045

(51) Int. Cl.
*F01D 11/24*    (2006.01)
*F01D 9/06*    (2006.01)
(Continued)

(52) U.S. Cl.
CPC .............. *F01D 11/24* (2013.01); *F01D 9/065* (2013.01); *F01D 11/20* (2013.01); *F01D 17/20* (2013.01);
(Continued)

(58) Field of Classification Search
CPC ........... F05D 2240/11; F05D 2240/307; F01D 17/105; F01D 17/20; F01D 9/065; F01D 11/16; F01D 11/20; F01D 11/24
See application file for complete search history.

(56) References Cited

U.S. PATENT DOCUMENTS 6,250,061 B1 * 6/2001 Orlando .................... F02C 3/13
                                                         60/772
6,615,574 B1 * 9/2003 Marks ....................... F02C 7/18
                                                         60/772
(Continued)

FOREIGN PATENT DOCUMENTS

FR    2883926 A1 * 10/2006    ................ F02C 9/18
FR    3 002 971 A1    9/2014
(Continued)

OTHER PUBLICATIONS

International Search Report dated Jan. 4, 2018 in PCT/FR2017/052291 filed Aug. 28, 2017.
(Continued)

*Primary Examiner* — Todd E Manahan
*Assistant Examiner* — Sean V Meiller
(74) *Attorney, Agent, or Firm* — Oblon, McClelland, Maier & Neustadt, L.L.P.

(57) ABSTRACT

A device for controlling the clearance between a rotor and a stator surrounding same, which is carried out by modifying the delivery flow carried in a rotor recess in order to provide a bleed flow that prevents the gases from the flow section from penetrating into the recess. A valve can partially close (Continued)

the delivery circuit, thus reducing the cooling of the rotor structure and allowing the expansion thereof and the reduction of the clearance with the stator, for certain operating speeds including cruise operating speeds. In addition, the delivery air is heated more at a lower flow rate, especially if it is made to follow a bypass provided with meanders in the hottest portions of the circuit.

9 Claims, 2 Drawing Sheets

(51) Int. Cl.
  F01D 11/20 (2006.01)
  F02C 9/20 (2006.01)
  F02C 9/28 (2006.01)
  F01D 17/20 (2006.01)

(52) U.S. Cl.
  CPC ............... F02C 9/20 (2013.01); F02C 9/28 (2013.01); *F05D 2240/307* (2013.01)

(56) References Cited

U.S. PATENT DOCUMENTS

| | | | |
|---|---|---|---|
| 6,968,696 B2* | 11/2005 | Little | F01D 5/08 60/772 |
| 8,602,724 B2* | 12/2013 | Takahashi | F01D 9/041 415/145 |
| 9,261,022 B2* | 2/2016 | Saha | F01D 17/145 |
| 2005/0050901 A1 | 3/2005 | Little | |
| 2014/0205447 A1* | 7/2014 | Patat | F02C 6/08 415/177 |
| 2015/0176590 A1* | 6/2015 | Taylor-Tibbott | F02C 7/24 60/785 |
| 2015/0285088 A1* | 10/2015 | Ballard, Jr. | F02C 7/185 60/782 |
| 2015/0337682 A1* | 11/2015 | Yeager | F01D 9/065 415/1 |
| 2016/0326878 A1* | 11/2016 | Morimoto | F01D 11/24 |
| 2017/0234135 A1* | 8/2017 | Takamura | F01D 5/08 415/116 |

FOREIGN PATENT DOCUMENTS

| | | |
|---|---|---|
| FR | 3 002 972 A1 | 9/2014 |
| FR | 3 010 729 A1 | 3/2015 |

OTHER PUBLICATIONS

U.S. Appl. No. 15/741,545, filed Jan. 3, 2018, US 2018/0195411 A1, Baptiste Marie Aubin Pierre Jouy et al.

* cited by examiner

METHOD AND DEVICE FOR ADJUSTING THE CLEARANCE BETWEEN A ROTOR AND A CONCENTRIC STATOR OF AN AIRCRAFT TURBINE ENGINE

BACKGROUND OF THE INVENTION

Field of the Invention

The invention relates to a method, as well as a device for adjusting the clearance between a rotor and a concentric stator of an aircraft turnomachine.

Description of the Related Art

The optimization of existing radial clearance between the rotor and the stator of turbomachines is necessary for improving their efficiency. The clearance is governed by the mechanical deformation of the rotor when it is turning, as well as by the thermal dilations of the rotor and of the stator. These deformations are different in the various regimes of the machine, and differential thermal dilations also often exist between the rotor and the stator, in transient or stabilized conditions.

Active clearance adjustment devices consist of blowing a gas at a different temperature on one portion of the stator of the machine of which the deformation must be modified. In customary devices, the procedure is to extract a portion of the air flow passing through the gas flow path, at a location of the compressors where the air is still relatively cool but already compressed, and it is then made to traverse a circuit in the interior of the stator to cause it to impact the stator in the vicinity of the flow path in the location of the turbines which incur the greatest heating. The blown air being cooler than the turbines, it contracts the stator and moves it closer to the rotor.

Such a system for reducing clearance by the impact of cool air on the stator constitutes the known LPTACC device, implementations of which are described for example in documents FR 3 002 971 A, FR 3 002 972 A and FR 3 010 729 A.

The search for increased performance drives the improvement of these known ventilation devices. A new method and a new clearance adjustment device have been researched and form the subject of the invention.

They are founded on ventilation of the rotor, this additional ventilation being adjustable, with the intention of obtaining heating (or reduced cooling) of the rotor with respect to known designs, with the effect of a relative thermal dilation of the rotor and of an additional reduction of the clearance between it and the stator, in certain circumstances of operation of the aircraft.

Ventilation of the rotors of aircraft is in fact known, in order to create what is called a purge flow rate out of the rotor at the location of the turbines, where openings called purge openings cause the flow path of the gases to communicate with the interior of the rotor, and avoid leakage of hot gases from the flow path in the interior of the rotor while cooling the bottoms of sockets of the disks which carry the movable blades of the rotor.

Document US 2005/0050901 A1 describes a turbomachine where cool ventilation air, originating from the exterior, is blown into a cavity of the rotor at variable temperatures after having passed through different devices such as a boiler or a heat exchanger, or having bypassed them by means of valves. The turbomachine described in this document does not, however, relate to aeronautics.

BRIEF SUMMARY OF THE INVENTION

The invention is founded on the observation that, in certain regimes of the machine such as the cruise regime at a moderate rotation speed of the machine and of the aircraft, temperatures in the flow path in the vicinity of the turbine reduce the need for a high purge flow rate and the cooling needs at the disks are smaller than in other conditions, corresponding to full output, such as takeoff. It is then in conformity with the invention to adapt the purge device and to reduce the blowing of air into the cavity of the rotor in order, for these cruise regimes, to moderate their cooling induced by the blown gas by increasing the temperature of this gas, which has as its consequence an increase in the temperature, a dilation of the rotor, and a reduction of its clearance with the stator. The purge flow rate out of the cavities of the rotor persists, because it is selected, in known devices, where the ventilation cannot be adjusted to be maintained in all operating conditions of the machine and it is therefore oversized during cruise. A reduction in flow rate is not sought, however, for its own sake, but only because it accompanies, for the cruise regimes to which it is applied, with reduced cooling of the rotor and with a reduction in clearance. A greater reduction in clearance is in fact practicable, and obtained with the invention, for cruise regimes where operating conditions are known and stabilized, while irregularities in heating and differential thermal dilations are large at full output, which corresponds rather often to transient conditions. The features of the machine, as regards heating and clearance, being more difficult to evaluate and changing rapidly, it is appropriate to maintain a high ventilation flow rate in the interior of the rotor to guarantee both sufficient cooling thereof and the retention of acceptable clearances.

It should be noted that the modulated ventilation of the rotor that is proposed with the invention, combined with the known ventilation of the stator which would probably be retained, will allow more precise adjustment of the distribution of clearance along the turbine, because it will then be easier to design the machine for this objective by selecting favored and possibly different ventilation regions, both for the rotor and the stator.

One aspect of the invention is a method for adjusting the clearance between a rotor and a stator of a turbomachine, the rotor being surrounded by the stator and separated from it by an annular gas flow path, at least one compressor, a combustion chamber and at least one turbine succeeding each other along the flow path, the turbomachine comprising a ventilation circuit of the turbine comprising a duct, traversed by a gas flow, of which one end leads into the flow path at the location of the compressor, and of which an opposite end leads into a cavity of the rotor at the location of the turbine, the cavity leading into the flow path by purge openings passing through a structure of the rotor separating the cavity from the flow path, characterized in that it consists of adjusting the flow rate of gas traversing the duct and entering into the cavity by adjusting a partial closure state of a valve disposed on the duct, the gas flow rate being adjusted in particular by being reduced for cruise conditions with respect to other conditions, particularly a takeoff condition, of the aircraft, the adjustment of the flow rate of gas in the partial closure state of the valve allowing an increase in the diameter of the structure of the rotor so as to reduce the clearance with the stator.

The reduced ventilation is accompanied, as shown, by an elevation of the temperature of the rotor, responsible for a desired reduction in the clearance with the stator.

It is possible to reinforce this effect by also adjusting the temperature of the gas traversing the duct even before it reaches the cavity of the rotor.

If a ventilation of the stator by a second flow rate of gas traversing the ventilation circuit is also carried out, this second flow rate of gas will generally be cooler than the flow rate of gas mentioned previously, thanks to favorable dispositions of the ventilation circuit causing this first gas flow through hotter portions of the machine, even if the two flows originate at the same point of extraction, normally at the location of the compressors.

Another aspect of the invention is a device for adjusting the clearance between a rotor and a stator of a turbomachine of an aircraft, the rotor being surrounded by the stator and separated from it by an annular gas flow path, at least one compressor, a combustion chamber and at least one turbine succeeding one another along the flow path, the turbomachine comprising a ventilation circuit of the turbine comprising a duct of which one end leads into the flow path at the location of the compressor, and of which one opposite end leads into a cavity of the rotor at the location of the turbine, the cavity leading into the flow path through ventilation portions extending into the purge openings passing through a structure of the rotor separating the cavity from the flow path, characterized in that the duct is provided with a partial and adjustable duct closure valve, and with a valve control means depending on the conditions of the aircraft, including a cruise condition and a takeoff condition (or, more generally, a full output condition, or even a condition higher than the cruise regime).

The control of the valve allows the partial closure of the duct and reducing the flow rate of cool air which is passing and therefore the cooling of the rotor, the more so since the air, when blown at a lesser speed, is heated to a greater extent by convection during its travel toward the cavity of the rotor.

This is particularly apparent in the frequent configurations where the duct comprises an upstream portion extending inside the stator, around the flow path, then a portion extending in the arms of the stator which pass radially through the flow path downstream of the combustion chamber, and which the burning gases originating in the combustion chamber bypass, in which the air is strongly heated.

The characteristic disposition of the invention is independent of the number of ducts used, because the duct mentioned up to the present is generally branched into parallel ducts distributed around the stator so as to homogenize the distribution of air on the circumference. The valve considered in the invention can then consist of a single valve disposed on a single duct at the inlet of the circuit, ahead of a branched distributor; it can also be present on each of the parallel ducts resulting from this branching.

In control modes capable of exerting greater adjustments, the duct comprises a bifurcation between a main branch carrying the valve and a bypass branch. It is then possible to vary the distribution of flow rates passing through the main branch and the bypass branch, perhaps obtaining a nearly complete commutation of flow rates between these two branches. However, if these branches have judiciously selected dispositions, the heating of the blown air can be much higher in one than in the other: the modification of heat exchange between the blown air in the rotor cavity and the rotor itself, previously unexploited and produced by modification of the blowing flow rate in the implementations of the invention disclosed up to the present, can then be reinforced by modification of the temperature attained by this gas in the rotor cavity.

Thus it is that the bypass branch can be longer than the main branch: the length offers greater heating of the air.

Advantageously, the bypass branch can comprise successive portions extending in the arms of the stator mentioned above, and traversed in opposite directions along these arms in their travel toward the cavity of the rotor, because heating is particularly present in these arms.

BRIEF DESCRIPTION OF THE SEVERAL VIEWS OF THE DRAWINGS

These aspects, features and advantages of the invention, as well as others, will now be described by means of the following figures, which show two important, but purely illustrative embodiments of the invention.

DETAILED DESCRIPTION OF THE INVENTION

Figure 1:
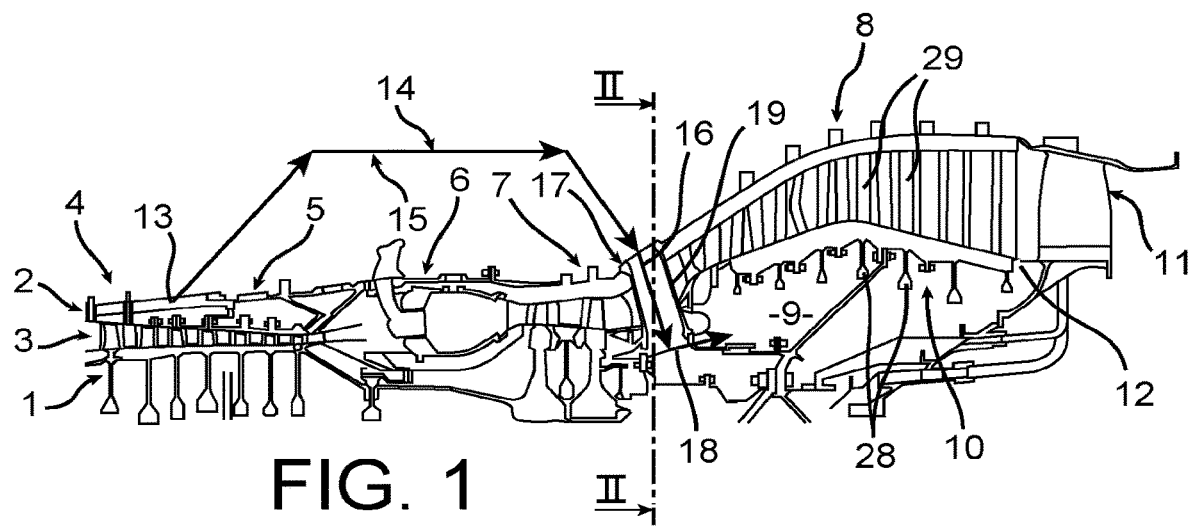
FIGS. 1 and 2 illustrate an ordinary turbomachine equipped with a blowing device, in longitudinal section then in transverse section at the location of the radial arms which pass through the flow path (line II-II in FIG. 1)

A turbomachine comprises a rotor 1, a stator 2 surrounding the rotor 1, and an annular gas flow path 3 extending between them. Encountered successively, downstream of the flow path 3, is at least one compressor for the air penetrating into the flow path 3 (normally a low-pressure compressor 4 and a high-pressure compressor 5), a combustion chamber 6, and at least one turbine (normally a high-pressure turbine 7 and a low-pressure turbine 8) in which the combustion gases expand progressively while driving the rotor 1.

Figure 2:
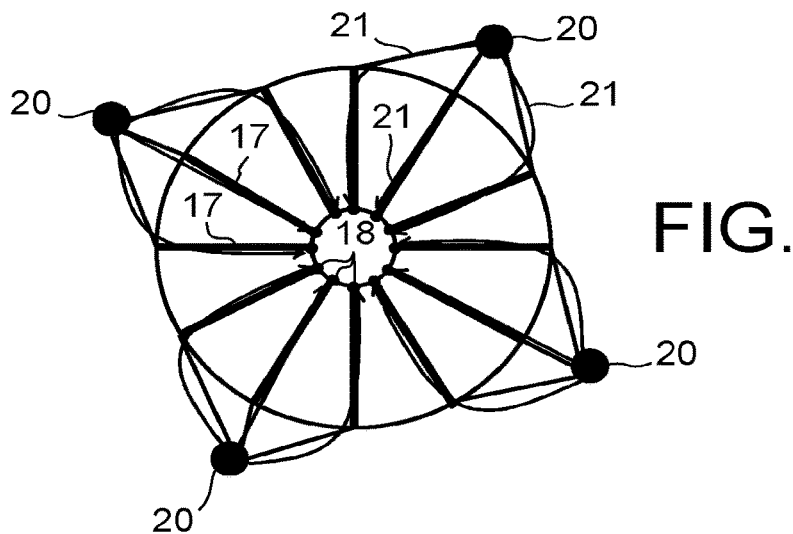

A rotor cavity 9 extends at the location of the low-pressure turbine 8. It is surrounded by the structure 10 of the rotor of the low-pressure turbine 8, and also delimited by fixed structures which are therefore integral with the stator 2, in particular at the downstream end 11 of the turbomachine. Circular purge openings 12, extending necessarily between the movable structure 10 and the fixed structures, cause the rotor cavity 9 to communicate with the flow path 3. This is why it is customary to extract air originating in the high-pressure compressor 5, from a collection opening 13 established on the wall of the stator 2, to blow it into the rotor cavity 9 after having made it traverse a circuit 14, only sketched here but composed of tubes connected to one another. The circuit 14 comprises an upstream portion 15 in the interior of the stator cavities 2, around the flow path 3, then one portion 16 which passes into a radial arm 17 passing through the flow path 3 downstream of the combustion chamber 6, before blowing air in front of the rotor 1 and causing it to reach the cavity of the rotor 9, through injectors 18 passing through a wall 19 delimiting this cavity. FIG. 2 shows that the circuit 14 is generally branched, with completely starting from a plurality of extraction openings 13, or downstream of a single extraction opening 13, and it then comprises a plurality of parallel supply tubes 20 (four in the case shown) leading to in front of the radial arms 17, then each branching into distribution tubes 21 (twelve in all in the example shown) passing through the radial arms 17 and each terminating in front of one of the injectors 18. The air of the circuit 14 also serves to cool the disks 28, carrying the movable blades 29 of the low-pressure turbine 8 and protruding into the rotor cavity 9.

Figure 3:
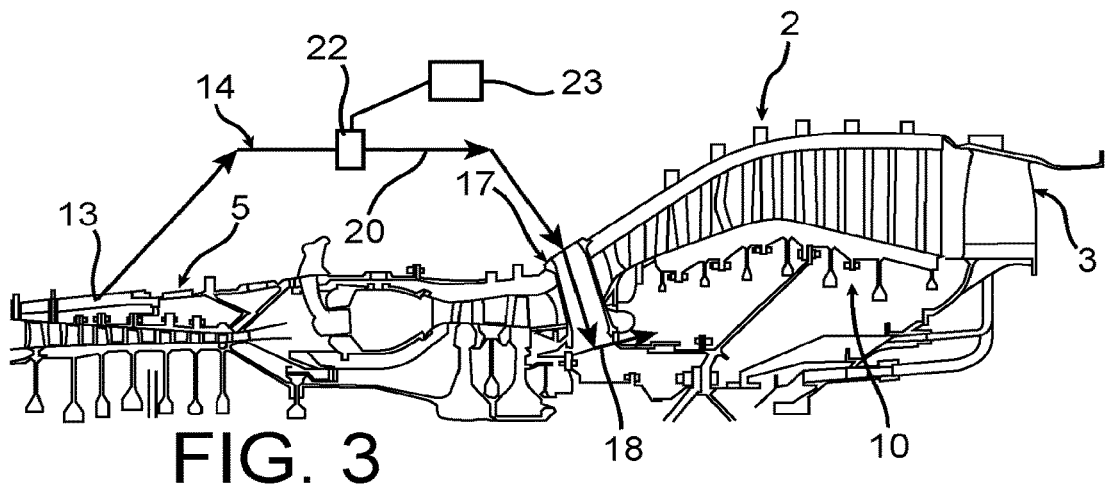
FIG. 3, a turbomachine derived from the preceding one and equipped with the invention.

One embodiment of the invention is described in FIG. 3. The device of FIGS. 1 and 2 is completed by a valve 22 on the circuit 14, for example on the upstream portion 15, and more precisely on each of the supply tubes 20. In this particular embodiment, there are therefore four valves 22 similar to one another and controlled in the same manner by a device 23 depending on different state parameters of the turbomachine (speed of rotation, temperature attained, operation history, etc.). As a variant, if a circuit 14 with a single origin was used, it could be good to place a single valve 22 between the extraction point 13 and the branched distributor leading to the supply ducts 20.

The valve 22 is completely open under circumstances where a large purge and high cooling of the disks are necessary, as in the takeoff regime. In other circumstances, particularly in the cruise regime, at a moderate operation of the turbomachine, it is arranged to partially close the valve 22 to reduce the flow rate passing through the circuit 14. The result is heating of the structure 10 of the rotor 1 with respect to blowing with the valve 22 completely open, first because the flow rate of cool air is reduced, and also because this air has more opportunity to be heated in the circuit 14, particularly while passing through the radial arms 17. The structure 10 therefore acquires a greater radius, which reduces clearance with the stator.

Figure 4:
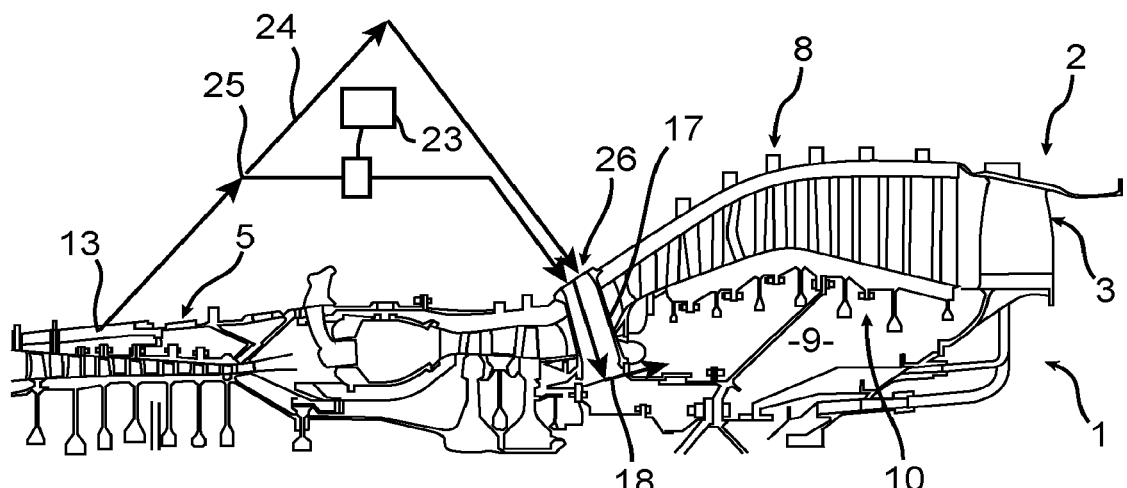
FIGS. 4 and 5, another embodiment of the invention in longitudinal, then transverse section.
Figure 5:
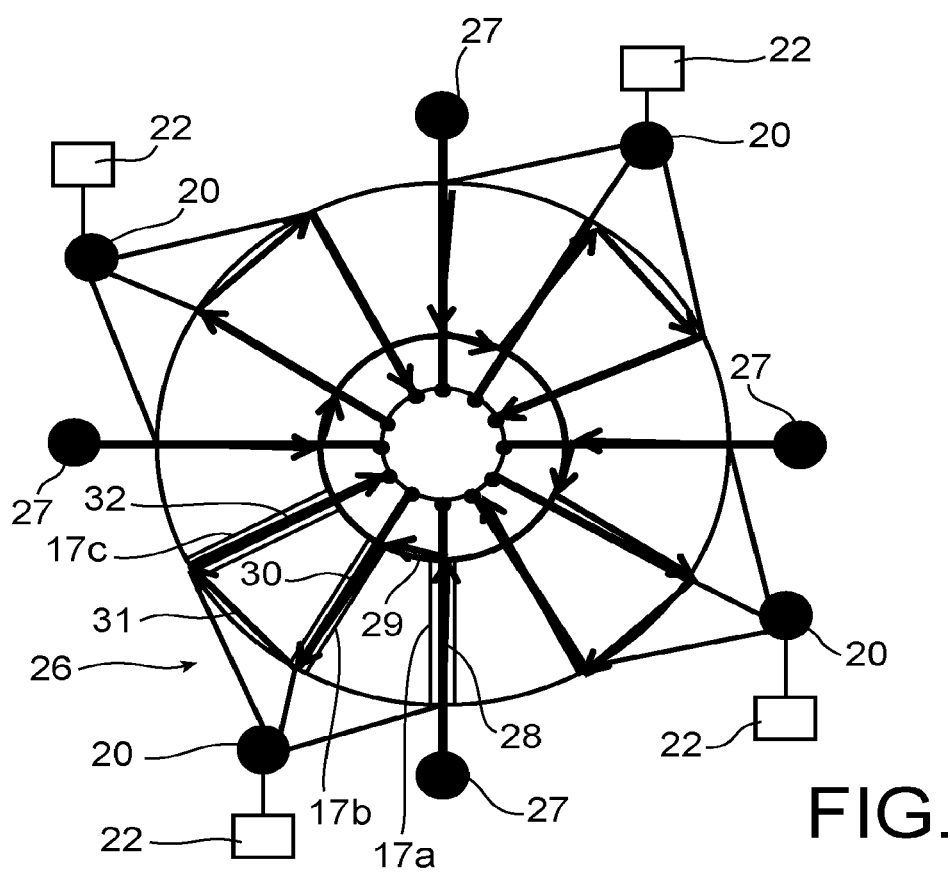

In the modified embodiment of FIGS. 4 and 5, a bypass branch 24 also terminating at the injectors 18 while passing though the radial arms 17 is added to the circuit 14 encountered up to the present and comprising another valve 22 controlled by the device 23. The departure of the bypass branch 24 is at a bifurcation 25 upstream of the valve 22. Here too, this disposition is repeated for all the branched portions of the circuit 14, such as the supply tubes 20 if they exist.

The bypass branch 24 can take on the aspect of a pipe extending in meanders 26 in the interior of the radial arms 17, which is shown schematically in FIG. 4 and shown in more detail in FIG. 5.

Found again are the four supply tubes 20 and the twelve branching tubes 21, passing through as many radial arms 17, of the previous embodiment. To this equipment are added four secondary supply tubes 27, parallel to the supply tubes 20 and belonging to the bypass branch 24, which each continue into a first tube segment 28 passing through a first radial arm (such as 17a), an internal connection section 29, a second tube segment 30 passing through a second radial arm (17b) in proximity to the preceding 17a (the air traversing it to the exterior, while the first segment 28 was toward the interior), an external connection section 31, and a third tube segment 32 passing through a third radial arm 17c in proximity to the preceding 17b, and arriving before the corresponding injector 18. The tube segments 28, 30 and 32 are in proximity to the branching tubes 21 in the radial arms 17 are compose the meanders 26 with connecting sections 29 and 31. The air using them is therefore heated in three radial arms (17a, 17b and 17c) instead of only one.

The portions of the circuit on which the valves 22 are installed correspond to a main branch of the circuit 14 by which most of the blowing flow rate passes when the valves 22 are open. In fact, calibration holes, not shown, limit the flow rate passing by the bypass branch 24. When the valves 22 are closed, however, for the same result as before, to reduce the blowing flow rate, this is transferred to the bypass branch 24 and its value is reduced, even if the valves 22 are completely closed, which is practicable in this embodiment.

The same effect of dilation of the structure 10 is then obtained thanks to this reduction in the flow rate value; it is even reinforced by the increased heating accomplished in the meanders 26, because the air remains longer in this hotter portion of the circuit 14 due the extension that they procure. This variant embodiment is therefore capable of giving better results that the preceding one, while being more complicated.

In all the embodiments of the invention, the ventilation circuit of the rotor can cooperate with a ventilation circuit of the stator which is distinct from it or forms another branch of the same ventilation circuit: shown in FIG. 4 is such a stator 2 ventilation circuit 33 which comprises a duct starting from the same extraction opening 13 and which terminates at the stator 2 through branches 34. The joint ventilation of the rotor 1 and of the stator 2 allows not only a reduction in the clearance of the low-pressure turbine 8, but distributing more smoothly and optimally this reduction of clearance along said turbine 8.

The invention claimed is:

1. A device for adjusting the clearance between a rotor and a stator of an aircraft turbomachine, the rotor being surrounded by the stator and separated from the stator by an annular gas flow path, the aircraft turbomachine comprising at least one compressor, a combustion chamber and at least one turbine succeeding one another along the flow path, the device comprising, a ventilation circuit of the turbine comprising a duct, a first end of the duct leads into the flow path at a location of the compressor, and a second end of the duct leads into a cavity of the rotor at a location of the turbine; and a partial and adjustable duct closure valve provided on the duct, wherein the duct comprises an upstream portion extending inside the stator around the flow path, and a downstream portion extending in arms of the stator which pass radially through the flow path downstream of the combustion chamber, wherein a section of the upstream portion extends radially outward from the compressor, and wherein the downstream portion of the duct comprises successive portions extending in the arms of the stator and traversed in opposite directions along said arms toward the cavity of the rotor, said successive portions being first, second, and third successive portions, in which a ventilation gas present in the ventilation circuit flows successively inwardly through the first successive portion in a first arm of the stator, outwardly through the second successive portion in a second arm of the stator, and inwardly through the third successive portion in a third arm of the stator in a radial direction of the aircraft turbomachine before flowing out of the duct into the cavity of the rotor, the cavity being provided with purge openings passing through a structure of the rotor separating the cavity from the flow path, the first, second, and third arms of the stator being circumferentially spaced from each other.

2. The device for adjusting clearance according to claim 1, wherein the upstream portion is branched into parallel ducts distributed around the stator, and wherein each of said parallel ducts carries one said valve.

3. The device for adjusting clearance according to claim 1, wherein the duct comprises a bifurcation between a main branch carrying the valve and a bypass branch.

4. The device for adjusting clearance according to claim 3, wherein the bypass branch is longer than the main branch.

5. The device for adjusting clearance according to claim 3, wherein the bypass branch is provided with calibration holes that limit a flow rate passing by the bypass branch.

6. The device for adjusting clearance according to claim 1, wherein the valve is controlled by a device depending on state parameters of the aircraft turbomachine.

7. The device for adjusting clearance according to claim 6, wherein the device for controlling the valve is arranged to partially close the valve at moderate operation of the aircraft turbomachine.

8. The device for adjusting clearance according to claim 7, wherein the moderate operation comprises cruise regimes, and said device is arranged to open the valve completely at a takeoff regimes of the aircraft.

9. The device for adjusting clearance according to claim 1, wherein the first and second successive portions are connected by an internal connection section, and the second and third successive portions are connected by an external connection section.

* * * * *